US010933707B2

(12) United States Patent
Gerhards et al.

(10) Patent No.: US 10,933,707 B2
(45) Date of Patent: Mar. 2, 2021

(54) MOTOR VEHICLE LEAF SPRING ASSEMBLY

(71) Applicant: Ford Global Technologies, LLC, Dearborn, MI (US)

(72) Inventors: Thomas Gerhards, Niederzier (DE); Alberto Girelli Consolaro, Aachen (DE); Ralf Hintzen, Aachen (DE); Daniel Mainz, Herzogenrath (DE); Rainer Souschek, Aachen (DE); Friedrich Peter Wolf-Monheim, Aachen (DE); Nicole Zandbergen, Würselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 16/244,184

(22) Filed: Jan. 10, 2019

(65) Prior Publication Data

US 2019/0210420 A1 Jul. 11, 2019

(30) Foreign Application Priority Data

Jan. 11, 2018 (DE) ............... 10 2018 200 323.8

(51) Int. Cl.
*B60G 11/04* (2006.01)
*B60G 9/00* (2006.01)
*B60G 11/113* (2006.01)

(52) U.S. Cl.
CPC ............. *B60G 11/04* (2013.01); *B60G 9/00* (2013.01); *B60G 11/113* (2013.01); *B60G 2200/30* (2013.01); *B60G 2202/112* (2013.01); *B60G 2204/121* (2013.01); *B60G 2204/4306* (2013.01); *B60G 2204/43065* (2013.01); *B60G 2206/428* (2013.01); *B60G 2206/7101* (2013.01); *B60G 2206/7104* (2013.01); *B60G 2206/73* (2013.01)

(58) Field of Classification Search
CPC ............... B60G 11/04; B60G 11/113; B60G 2204/4306; B60G 2206/7101; B60G 2206/428; B60G 2204/121; B60G 2202/112; B60G 11/10; F16F 1/30
See application file for complete search history.

(56) References Cited

U.S. PATENT DOCUMENTS 1,076,961 A * 10/1913 Doble ................ B60G 11/113
267/52
1,225,458 A * 5/1917 Matthew ............. B60G 11/04
267/45

(Continued)

FOREIGN PATENT DOCUMENTS

GB 2128714 B 7/1986

*Primary Examiner* — Frank B Vanaman
(74) *Attorney, Agent, or Firm* — Raymond L. Coppiellie; Burgess Law Office, PLLC

(57) ABSTRACT

A leaf spring assembly resiliently supporting a wheel carrier on a vehicle body of a motor vehicle. The leaf spring assembly including first and second spring leaves and a clamp having a clamping part exerting a clamping force whereby the first and second spring leaves are held together by the clamp. A bridging part arranged between the first spring leaf and the clamping part transmits at least part of the clamping force from the clamping part to the first spring leaf bridging the second spring leaf and reducing the clamping force exerted thereon.

13 Claims, 4 Drawing Sheets

(56) References Cited

U.S. PATENT DOCUMENTS

| | | | | |
|---|---|---|---|---|
| 1,419,788 | A | * | 6/1922 | Wattel .................... B60G 11/113 267/53 |
| 2,635,870 | A | * | 4/1953 | Laher ..................... B60G 11/04 267/45 |
| 2,861,798 | A | * | 11/1958 | Lenet ..................... B60G 11/04 267/45 |
| 4,887,802 | A | | 12/1989 | Wilcox |
| 6,012,709 | A | * | 1/2000 | Meatto ................... B60G 11/04 267/36.1 |
| 2005/0269796 | A1 | * | 12/2005 | Sawarynski ......... B60G 17/023 280/124.174 |
| 2011/0101639 | A1 | * | 5/2011 | Takeda ................... B60G 11/04 280/124.116 |
| 2014/0284856 | A1 | | 9/2014 | Stay |

* cited by examiner

MOTOR VEHICLE LEAF SPRING ASSEMBLY

CROSS-REFERENCE TO RELATED APPLICATIONS

Not Applicable.

BACKGROUND OF THE INVENTION

1. Field of the Invention

The present invention relates generally to a leaf spring assembly for a motor vehicle wheel suspension; and more specifically to a leaf spring assembly including two spring leaves for resiliently supporting a wheel carrier on a vehicle body.

2. Description of Related Art

Leaf spring assemblies that resiliently support a wheel carrier on a motor vehicle are generally known in the art. A wheel carrier includes any device creating a mechanical connection between a vehicle wheel held by the wheel carrier and the wheel suspension of the motor vehicle. Leaf spring assemblies are used in commercial vehicles, for example smaller and larger trucks. The leaf springs are usually attached to the motor vehicle oriented in such a manner that their longitudinal extension runs substantially parallel to a longitudinal direction of the motor vehicle.

As is generally known, a leaf assembly may include a plurality of spring leaves formed of a metal material and/or a fiber composite material. In the suspension section of the leaf spring, the wheel carrier is usually connected to the leaf spring assembly via a fastening mechanism, wherein the fastening mechanism couples all the spring leaves of the leaf spring assembly together, pressing them one against another. Besides being used for fastening the wheel carrier to the leaf spring, the fastening mechanism also clamps the individual spring leaves to one another and is therefore also referred to herein as clamp.

SUMMARY OF THE INVENTION

A wheel suspension for a motor vehicle including a leaf spring having a suspension section including a first spring leaf and a second spring leaf. A clamp holds the first spring leaf and second spring leaf adjacent one another. The clamp including a clamp plate adjacent the second spring leaf. A bridging part extends between the first spring leaf and the clamp plate. The bridging part extending forming a force transmission path that bypasses the second spring leaf and transmits at least a portion of the clamping force directly from the clamp plate to the first spring leaf reducing the clamping force on the second spring leaf.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4a shows an embodiment including three cylindrical bridging parts.

FIG. 4b shows an embodiment including four cylindrical bridging parts arranged in a rectangle.

FIG. 4c shows an embodiment including two elliptical bridging parts, each having an elliptical cross section.

FIG. 4d shows an embodiment including four elliptical bridging parts arranged in a rectangle.

FIG. 4e shows an embodiment including two cruciform bridging parts and a link-shaped bridging part.

DETAILED DESCRIPTION OF THE PREFERRED EMBODIMENTS

The following description of the preferred embodiment(s) is merely exemplary in nature and is in no way intended to limit the invention, its application, or uses.

Parts that are comparable in terms of their function are always provided with the same reference numbers in the different figures, meaning these are usually also only described once.

Figure 1:
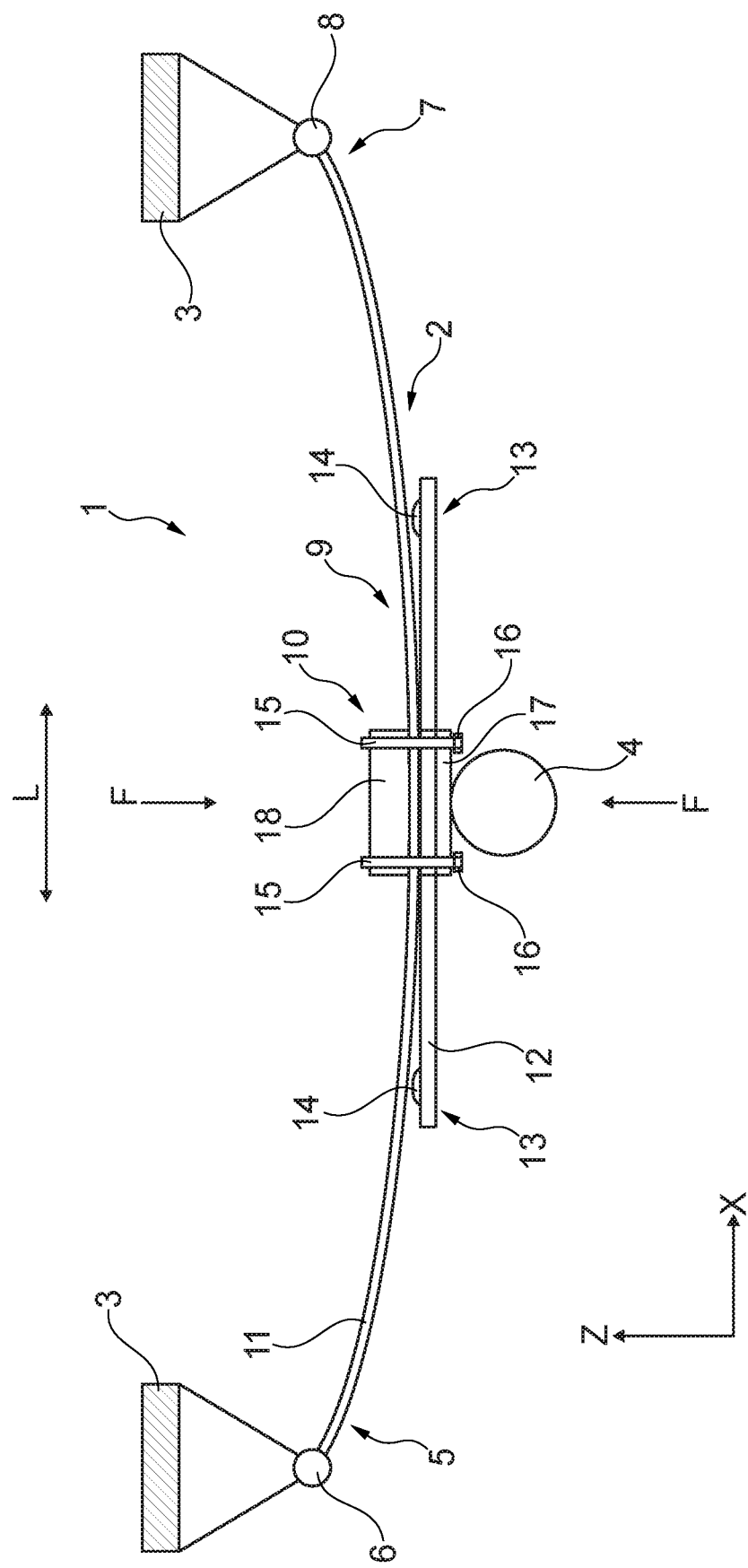
FIG. 1 is a schematic, side view of a basic design of an exemplary embodiment of a leaf spring assembly according to the invention.

FIG. 1 is a schematic side view of an exemplary embodiment of a leaf spring assembly 1 for a wheel suspension of a motor vehicle. The leaf spring assembly 1 attached to the motor vehicle with its longitudinal axis L extending substantially parallel to the longitudinal direction of the motor vehicle.

FIG. 1 shows a leaf spring assembly 1 on one side of the vehicle. The motor vehicle includes another leaf spring assembly 1 on the opposite side of the vehicle, wherein the leaf spring assembly 1 in FIG. 1 is on both sides of the vehicle.

The leaf spring assembly 1 includes a leaf spring 2 resiliently supporting a wheel carrier (not shown) on a vehicle body 3 of the motor vehicle, depicted schematically in FIG. 1. A rigid axle 4 holds the wheel carrier in the exemplary embodiment, wherein the rigid axle 4 and the wheel carrier, are connected to the leaf spring 2.

The leaf spring 2 has a first end section 5 with a first fastener 6 fastening the leaf spring 2 to the vehicle body 3, a longitudinally opposite second end section 7 with a second fastener 8 fastening the leaf spring 2 to the vehicle body 3, and a suspension section 9 extending between the two end sections 5, 7. A clamp 10 fastens the wheel carrier, in this case the rigid axle 4 holding or supporting the at least one wheel carrier, to the leaf spring 2. The rigid axle 4 can be connected to the clamp 10 through different connection methods, for example welding, screwing, riveting, and adhesion. Connection methods for fastening the rigid axle 4 to the clamp 10 are known in the art and are not further described.

The leaf spring 2 has two spring leaves 11, 12. The spring leaf 11 is also called the first or upper spring leaf and the spring leaf 12 as the second or lower spring leaf. In the exemplary embodiment depicted in FIG. 1, the first or upper spring leaf 11 is made of a metal material, for example steel, and the second lower spring leaf 12 is made of a fiber composite material.

The fiber composite spring leaf 12 of the leaf spring assembly 1 may also be called the supporting spring leaf or auxiliary spring leaf. Its main purpose is to support the metal spring leaf 11. The support provided gradually or progressively as the load on the leaf spring 2 increases, since the fiber composite spring leaf 12, unlike the metal spring leaf 11, is substantially straight in design, so the free ends 13 of the supporting spring leaf 12 are spaced furthest from the metal spring leaf 11 over the entire course of the longitudinal extension L of the fiber composite spring leaf 12 when the metal spring leaf 11 is in the unloaded state.

The first spring leaf 11 need not necessarily be made of a metal material, but may be a fiber composite spring leaf. Besides the first upper spring leaf 11, there may be additional upper leaf springs (not shown) configured in a similar manner to the first spring leaf 11, which are operatively connected to the spring leaf 11. The additional upper spring leaf/spring leaves not shown here is/are preferably made of the same material as the first spring leaf 11. It is unnecessary that the second lower spring leaf 12 be made of a fiber composite material, it could be made of a metal material, for example steel. The leaf spring assembly includes a leaf spring 2 having a first upper spring leaf 11 made of a metal material and a second lower spring leaf 12 made of a fiber composite material. The unloading of the fiber composite spring leaf 12 is advantageous, however, as the fiber composite spring leaf 12 reacts considerably more sensitively to high clamping forces introduced by the clamp 10 to the spring leaves 11, 12, particularly in the region of the claim 10 the leaf spring 2 opposite the metal spring leaf 11. A traditional embodiment of a leaf spring assembly known from the prior art can under certain circumstances be damaged by these. An overload damaging the fiber composite spring leaf 12 is safely prevented by the present invention, as set out in greater detail below.

The free ends 13 of the support spring leaf 12 contact the upper spring leaf 11 only when a large load is applied to it. To dampen this action, the supporting spring leaf 12 has, in the region of its free ends 13, rubber buffers 14 arranged between the first and second spring leaf 11, 12. The lower leaf spring 12 prevents overloading of the upper spring leaf 11.

FIG. 1 shows the leaf spring 2 of the leaf spring assembly 1 having two spring leaves 11, 12, at least in its suspension section 9. These are held pressed against one another by the clamp 10. The clamp 10 of the exemplary leaf spring assembly 1 has two substantially U-shaped bolts 15, or U-bolts, spaced apart from one another in the longitudinal direction L of the leaf spring. The U-bolts 15 enclose the two spring leaves 11, 12 on three sides, see FIG. 3. The leaf spring assembly 1 is shown on the upper side of the first spring leaf 11 facing away from the second spring leaf 12 and also along the two side surfaces of the spring leaves 11, 12. The lower open sides of the U-shaped bolts 15 are each closed by a lower clamping plate 17 secured by threaded nuts 16 on the free ends of the U-shaped bolt 15. The clamping plate 17 lying adjacent to an underside of the second spring leaf 12. In the exemplary embodiment the leaf spring assembly 1, the clamp 10 contains an upper clamping plate 18 inserted between the upper side of the first spring leaf 11 and the respective U-bolt 15. The clamp 10 exerts a clamping force F through the respective clamping parts 15, 16, 17, and 18 both in a first active direction on the first spring leaf 11 and in a second active force substantially opposite the first clamping force on the second spring leaf 12. The extent of the total clamping force F exerted by the clamp 10 on the leaf spring 2 is determined in a known manner by correspondingly tightening the threaded nuts 16.

Figure 2:
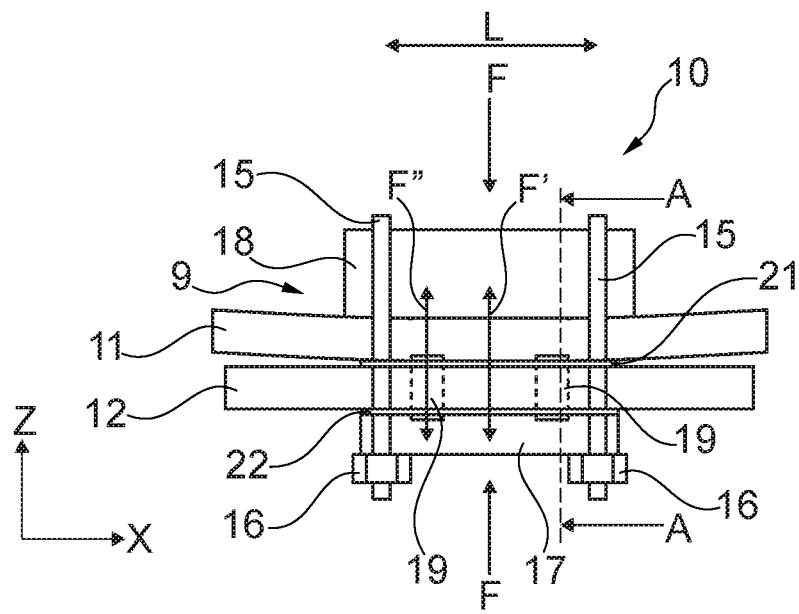
FIG. 2 is an enlarged, partial side view of a suspension section of the leaf spring assembly from FIG. 1 showing a fastening clamp.
Figure 3:
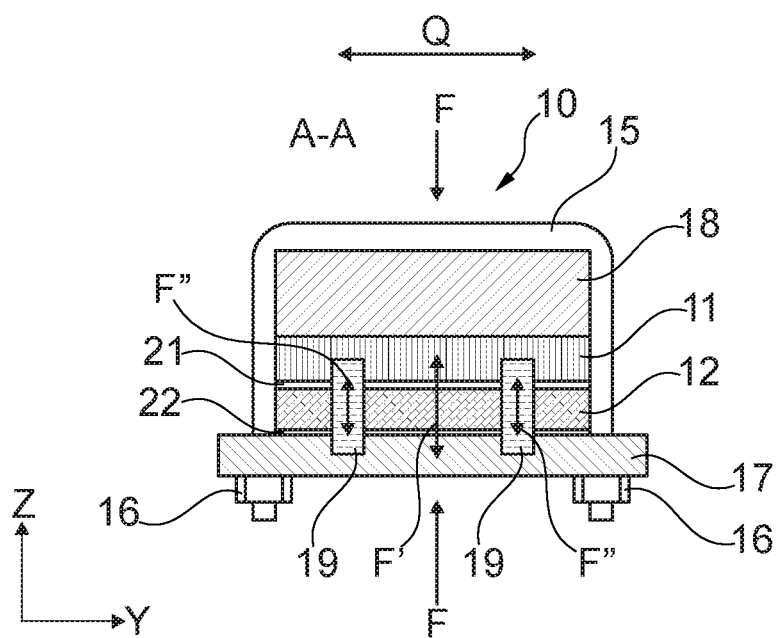
FIG. 3 is a cross-sectional view of the leaf spring assembly from FIG. 1 taken along the sectional line A-A in FIG. 2.

FIG. 2 shows a detailed sectional view of the suspension section 9 of the leaf spring assembly 1 including the clamp 10. FIG. 3 depicts a cross-sectional view of the leaf spring assembly 1 from FIG. 1 along the sectional line A-A in FIG. 2 in the transverse extensional direction Q of the leaf spring assembly 1.

FIGS. 2 and 3 show a plurality of bridging parts 19 arranged and configured between the first spring leaf 11 and the lower clamping plate 17 of the clamp 10 to absorb at least part of the clamping force F acting between the first spring leaf 11 and the clamping part 17 and transmit it between the spring leaf 11 and the clamping part 17. The proportion of the clamping force F absorbed and transmitted by the bridging parts 19 in each case is denoted in FIGS. 2 and 3 using the reference number F'''. Following the removal of all clamping force proportions F''' received by the bridging parts 19, a residual force proportion F', transmitted between the first and second spring leaf 11 and 12, remains of the total clamping force F. This residual force proportion F' may be zero when the total of all clamping force proportions F''' absorbed by the bridging parts 19 corresponds to the total clamping force F exerted by the clamp 10 on the leaf spring 2. In each case, the absorption of the clamping force proportions F''' by the bridging parts 19 leads to a reduction in the residual clamping force F' transmitted between the first and second leaf spring 11, 12 with a leaf spring assembly 1 as depicted in FIGS. 1 to 3 with a leaf spring 2 composed of at least one metal spring leaf 11 and a composite spring leaf 12. Preferably, the residual clamping force F' is at most half as great as the total clamping force F, so the composite spring leaf 12 is adequately unloaded and therefore protected from a damaging overload.

In addition, the bridging parts 19 bridge the second spring leaf 12 in a force-free manner, they are not connected to the second-spring leaf 12 in a force-fitting, substance-bonded or form-fitting manner in relation to the force transmission direction of the clamping force proportions F''' defined by them. With the exemplary embodiment of the leaf spring assembly 1 shown, the bridging parts 19 are columnar in design, taking the form of cylinders, for example. The force-free bridging of the second spring leaf 12 includes the second leaf spring 12 having through bores or openings 20, see FIG. 4, with correspondingly configured diameters, wherein the respective bridging parts 19 extend through the openings 20 in a substantially force-free manner.

Although the bridging parts 19 are not connected to the second spring leaf 12 in a force-fitting, substance-bonded or form-fitting manner in relation to their force transmission direction of the clamping force proportions F''', the bridging parts 19 most likely create a form fit for the spring leaves 11 and 12 in relation to the longitudinal direction L and the lateral direction Q of the spring leaves 11, 12 to reduce or prevent relative movement between them. Wherein wear, for example abrasion between the spring leaves 11, 12 resulting from relative movement is effectively prevented, particularly on their contact surfaces.

FIGS. 2 and 3 an exemplary embodiment including a planar intermediate layer 21, 22 inserted between the first spring leaf 11 and the second spring leaf 12 and between the second spring leaf 12 and the third clamping part 17 of the clamp 10. The intermediate layers 21, 22 are not required. These intermediate layers 21 and 22 may be made of a metal material, a rubber-elastic material and/or a dimensionally stable plastic. They may, in addition, be multi-layer in design, so that, for example, the intermediate layer 21 has a metal layer on its side facing the metal spring leaf 21 and a rubber-elastic layer or a dimensionally stable plastic layer on its side facing the fiber composite spring leaf 12. Likewise, the intermediate layer 22 may, for example, have a rubber-elastic layer or a dimensionally stable plastics layer on its side facing the fiber composite spring leaf 12 and a metal layer on its side facing the clamping part 17, particularly when the clamping part 17 is also made of a metal material. An embodiment of the intermediate layers 21 and 22 may be formed by two separate intermediate layers, one made of a metal material, the other of a rubber-elastic material or a dimensionally stable plastic in each case and two separate intermediate layers, one made of a metal material, the other of a rubber-elastic material or a dimensionally stable plastic. An intermediate layer adjacent to the fiber composite spring leaf 12, for example the intermediate layers 21 and 22, may, for example, be directly incorporated in the fiber composite spring leaf 12, for example vulcanized or inserted in a corresponding production form during the manufacturing process of the fiber composite spring leaf 12 and in this way incorporated in the fiber composite spring leaf 12.

FIGS. 4a, 4b, 4c, 4d and 4e depict five plan views of a contact surface 23 of different second spring leaves 12, 24, 25, 26, 27 in each case, according to further exemplary embodiments of a leaf spring assembly (not shown in its entirety here) according to the invention. A first spring leaf, for example, the spring leaf 11 in the leaf spring assembly 1, lies adjacent to the contact surface 23 shown of every second spring leaf in the manner described or is clamped against the second spring leaf 12, 24, 25, 26, 27 in each case by a clamp, for example the clamp 10 in FIG. 1. A respective position and course of the two U-bolts 15 of the clamp 10 in FIGS. 1-3 is indicated for example in FIG. 4 by a corresponding dotted line 15a.

Figure 4:
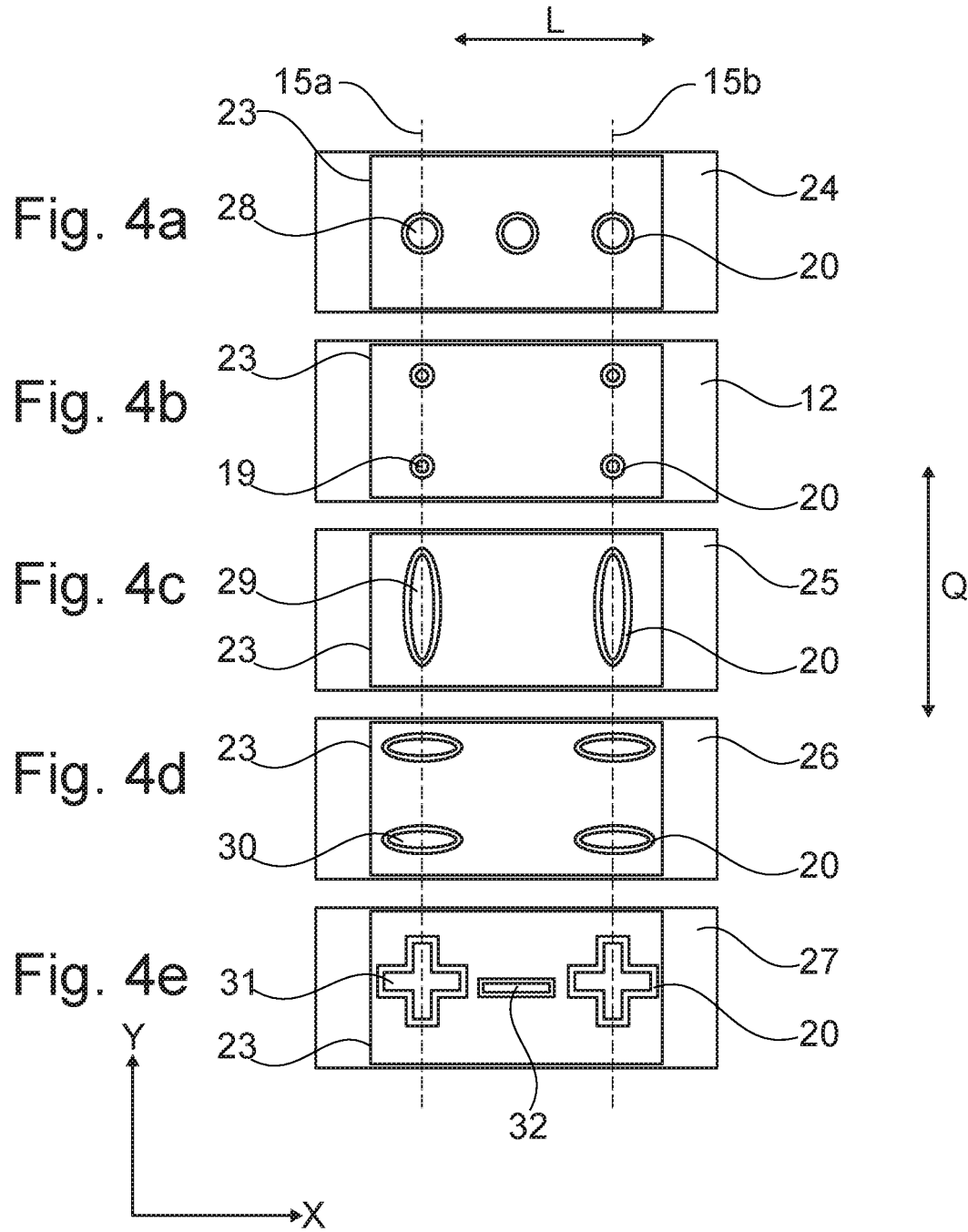
FIGS. 4a-4e are different plan views of a contact surface of different second spring leaves according to further exemplary embodiments of a leaf spring assembly according to the invention.

FIG. 4b shows a plan view of the second spring leaf 12 as described above. The other second spring leaves 24, 25, 26 and 27 depicted in FIG. 4 are also produced from a fiber composite material.

FIGS. 4a-4e show both the number, position, and shape, including the cross-sectional shape, of the bridging parts 19, 28, 29, 30 and 31 may be different. All bridging parts 28, 29, 30 and 31 in FIGS. 4a, 4c-4e are columnar in design, as with the bridging part 19, FIG. 4b already described above. As has mentioned earlier, the bridging parts, for example the bridging parts 19, 28, 29, 30 and 31 shown here, need not necessarily have a constant diameter over their columnar longitudinal extension, but they may also have at least one narrowing and/or at least one thickening.

In FIG. 4a three substantially identical, cylindrical bridging parts 28 are arranged linearly along the central longitudinal axis of the second spring leaf 24 running parallel to the longitudinal extension direction L. The bridging parts 28 have a larger diameter than, for example, the four cylindrical bridging parts 19 arranged in a rectangle in FIG. 4b of the leaf spring assembly 1 depicted in FIGS. 1 to 3 and FIG. 4b.

FIG. 4c shows two bridging parts 29 with an elliptical cross section, each aligned with the major axis of the ellipse extending substantially parallel to the transverse extension direction Q of the spring leaf 25.

FIG. 4d shows four bridging parts 30 likewise with an elliptical cross section, aligned in a rectangle, with the major axis of the ellipse extending substantially parallel to the longitudinal extension direction L of the leaf spring 26.

Finally, FIG. 4e shows a linear arrangement of two cruciform bridging parts 31 and a link-shaped bridging part 32 arranged between them.

A plurality of other different embodiments and arrangements of bridging parts are also possible and fall within the basic idea underlying the invention.

Figure 5:
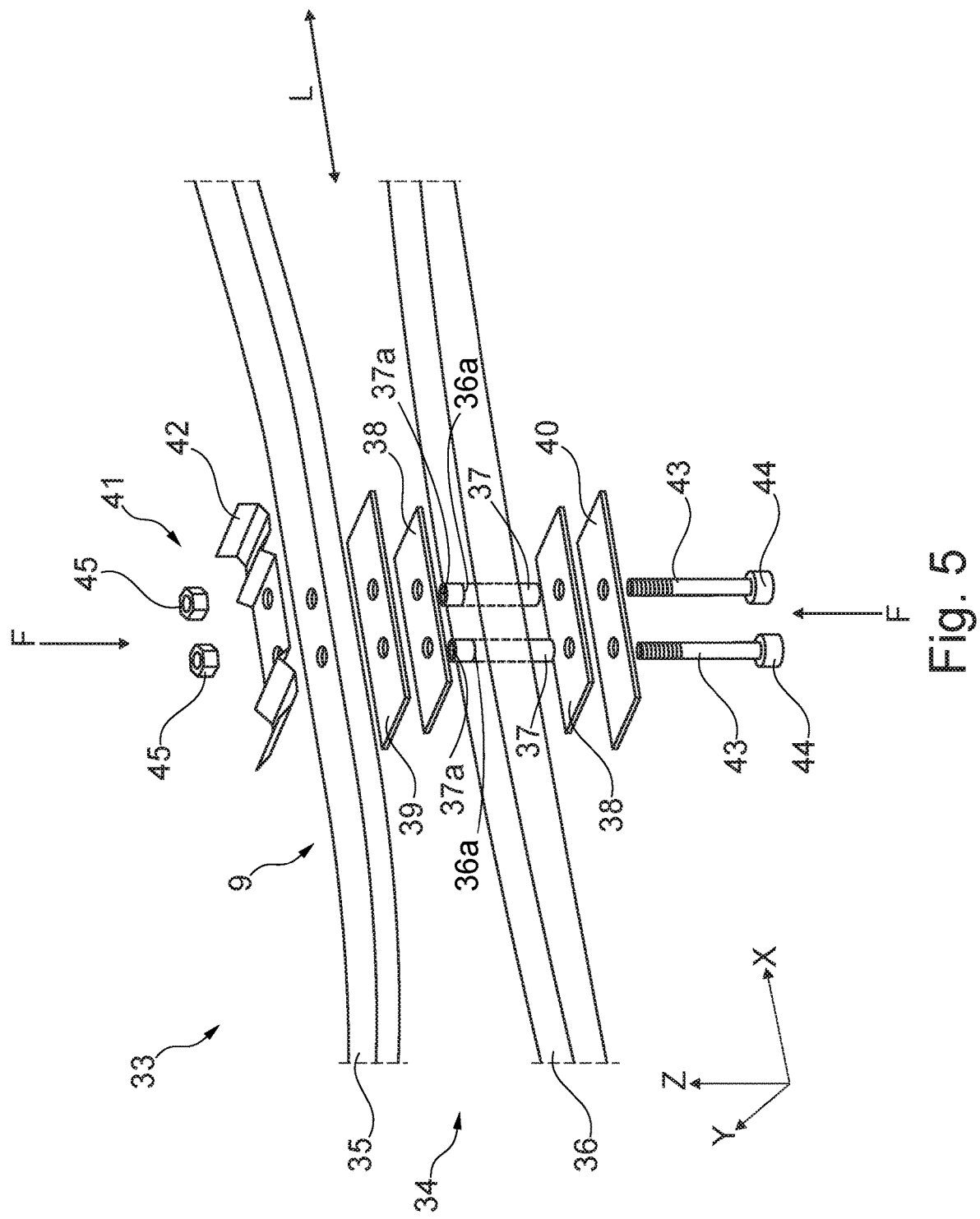
FIG. 5 is a perspective partial view of an additional exemplary embodiment of a leaf spring assembly according to the invention.

FIG. 5 shows a perspective partial view of another exemplary embodiment of a leaf spring assembly 33 according to the invention. The partial view depicts the suspension section 9 of a two-leaf leaf spring arrangement 34 of the leaf spring assembly 33. A first spring leaf 35 is formed from a metal material, for example steel, and a second spring leaf 36 from a fiber composite material. The leaf spring assembly 33 depicted in FIG. 5 has two bridging parts 37 that are columnar in design, as with the bridging parts 19, 28, 29, 30, 31 and 32 previously described. Bridging parts 37, unlike the bridging parts 19, 28, 29, 30, 31, and 32 made of a solid material, are hollow inside 37a, configured as hollow cylinders, for example, as depicted in FIG. 5.

FIG. 5 shows above and below the fiber composite spring leaf 36 and lying adjacent thereto are planar plastic intermediate layers 38, one upper and one lower. A planar metal intermediate layer 39 is furthermore arranged between the upper plastics intermediate layer 38 and the underside of the first spring leaf 35. A metal plate 40 is furthermore arranged on the underside of the plastics intermediate layer 38 arranged on the underside of the fiber composite spring leaf 35. This metal plate 40 forms the first clamping part of a clamp 41 which contains, a clamping plate 42 lying adjacent to the upper side of the metal spring leaf 35 as a second clamping part, two straight threaded bolts 43 each with a bolt head 44 as the third clamping parts, and threaded nuts 45 that can be screwed onto the respective end opposite the bolt heads 44 as the fourth clamping parts.

The bolts 43 of the clamp 41 are guided through the hollow cavity 37a of the bridging parts 37 in each case. This embodiment allows a compact design of the leaf spring assembly 33, as at least part of the clamp 41 runs inside the two spring leaves 35, 36. The two bridging parts 37 are guided in a force-free manner through corresponding through-openings 36a in the second spring leaf 36, as described for the leaf spring assembly 1 in FIGS. 1 to 3. In addition, they lie on the underside of the first spring leaf 35, on the underside of the metal intermediate layer 39, the upper side of the metal plate 40 acting as the first clamping part, or on the bolt heads 43 acting as the third clamping parts, so the total clamping force F exerted by the fastening clamping means 41 on the leaf spring 34 is partially guided via the bridging parts 37 arranged between the first spring leaf 35 and the first clamping part 40 or the third clamping parts 44 of the fastening clamping means 41 in a force-transmitting manner, as has been described above in relation to the leaf spring assembly 1.

Because the bridging parts 37 are directly adjacent to the metal intermediate layer 39, for example with their ends facing the first spring leaf 35, they bring a uniform clamping force distribution over the individual bridging points 37. Here, the metal intermediate layer 39 may also be referred to as the pressure plate. In the same way, the metal layer 40 may also act as a pressure plate for a uniform clamping force distribution on the individual bridging parts 37 of the bolt heads 44, if these lie adjacent to the metal layer 40 with their ends facing the bolt heads 44.

The bridging parts 37 may also be connected to a pressure plate 39, 40 in a substance-bonded or form-fitting manner, so an assembly of the corresponding leaf spring assembly can be realized even more easily and quickly.

The leaf spring assembly 1 in FIGS. 1 to 3 may also be provided with a pressure plate corresponding to the metal intermediate layer 39 in FIG. 5, like the intermediate layer 21 depicted in FIG. 2, to which the bridging parts 19 may be optionally fastened in a substance-bonded or form-fitting manner. The bridging parts 19 of the leaf spring assembly 1 may also be fastened to the lower clamping plate 17 of the clamp 10 in a substance-bonded or form-fitting manner. Suitable substance-bonding and form-fitting connection methods are, for example, adhesion, welding, screwing, and riveting.

In the embodiment of the leaf spring assembly 33 in FIG. 5, when the bolts 43 are sufficiently strong for the loads occurring during operation of the leaf spring assembly 33, further fastening mechanisms, other than the clamp 41 can be dispensed with. The wheel carrier or the rigid axle 4, FIG. 1, may be fastened to the metal plate 40.

However, should the bolts 43 not be strong enough to support operation loads of the motor vehicle, the leaf spring assembly 33 depicted in FIG. 5 with the clamp 41 may be a particularly easy-to-handle assembly arrangement in which the leaf spring assembly 33 for mounting is held together in a properly aligned manner by the clamp 41.

In the case of the previously described exemplary embodiments of the leaf spring assemblies 1 and 33, the clamping force proportion F" guided via the respective bridging parts 19, 28, 29, 30, 31, 32 and 37 can be selectively determined through the lengths thereof and/or through the thicknesses of the inserted intermediate layers 21, 22 and 38 and/or through the material properties thereof, in particular their stiffness or elasticity.

In the exemplary embodiment, the leaf spring assembly according is used in a wheel suspension for the resilient support of a wheel carrier, in particular a rigid axle holding or supporting the wheel carrier, on a motor vehicle, for example a commercial vehicle such as a truck.

The leaf spring assembly includes a leaf spring resiliently supporting a wheel carrier on a vehicle body of the motor vehicle. A wheel carrier means any device mechanically connecting a vehicle wheel to the wheel suspension of the motor vehicle, for example, a vehicle axle, such as a rigid axle, to which a wheel carrier on which a vehicle wheel is rotatably mounted is attached. The leaf spring has a first end section, containing a first leaf spring end, a second end section, containing a second leaf spring end, which is diametrically opposite this first end section, and a suspension section extending between two end sections. The leaf spring is attached to the vehicle body at its first leaf spring end by a suitable fastener and attached to the vehicle body at its second leaf spring end by suitable fastener. In contrast to the two end sections, primarily used to fasten the leaf spring to the vehicle body or to an auxiliary frame connected to the vehicle body, the suspension section provides the actual spring action of the leaf spring due to its elastic deflection capability.

In the suspension section of the leaf spring a clamp fastens or attaches the wheel carrier to the leaf spring. The leaf spring of the leaf spring assembly includes two spring leaves, at least in the suspension section, a first spring leaf and a second spring leaf held pressed against one another by the clamp because the clamp exerts a clamping force through a clamp part both in a first effective direction on the first spring leaf and also in a second effective direction substantially opposite the first effective direction on the second spring leaf. The clamp contains at least one clamp part exerting a necessary clamping force on the leaf spring, that is on at least some of the spring leaves forming the leaf spring, directly or also indirectly. The Insertion of an additional clamp part may, for example distribute the clamping force exerted by the first clamp part over a larger area on the spring leaf or spring leaves. Consequently, clamp part means each element of the clamp that introduces or transmits the clamping force produced by the clamp to the leaf spring, to at least some of the spring leaves forming the leaf spring, or to at least one further clamp part.

A bridging part arranged and configured between the first spring leaf and the clamp absorbs at least part of the clamping force acting between the first spring leaf and the clamp and transmits it between them, that is between the first spring leaf and the clamp, wherein it bridges the second spring leaf in a force-free manner.

Without a bridging part, the clamping force is usually introduced by a clamp part of the clamp to the first spring leaf, is substantially transmitted by the first spring leaf to the second spring leaf, and then received again by a clamp part of the clamp, and vice versa. Here, a substantially single force-transmission path is created that is followed by the clamping force, the force-transmission path leading from the clamping part via the first and second spring leaf and back again to the clamping part, and vice versa. The clamping force therefore acts substantially to the full extent both on the first and on the second spring leaf.

The clamp may exhibit a plurality of clamping parts, so the clamping force exerted by a first clamping part on the first spring leaf, for example, can be transmitted via the second spring leaf to a second clamping part different from the first clamping part. The clamp may, however, also have a clamping part enclosing the two spring leaves, for example in a metal or plastic strap that firmly encloses the at least two spring leaves and presses them together. While discussing a clamp or clamping part, a plurality of clamping parts can be supplied as or parts of the clamp, wherein the clamping force can be transmitted between multiple clamping parts; for example, introduction of the clamping force by a clamping part to the spring leaves need not necessarily be returned to the same clamping part.

According one embodiment a force-conveying bridging part between the first spring leaf and a clamping part of the clamp bridges the second spring leaf in a force-free manner, establishing a force-transmission path effective in traditional leaf spring assemblies for guiding the clamping force between the clamping part and the spring leaves pressed together by the clamp that can be advantageously split into a first clamping force path following the traditional force-transmission path from the clamping part via the two spring leaves back to the clamping part, and a second clamping force path leading from the clamping part via the first spring leaf, the at least one bridging part, and back to the clamping part, excluding the second spring leaf bridged in a force-free manner by the bridging part. The clamping force path in the leaf spring assembly is guided between the first spring leaf and the clamping part of clamp in at least two partial force paths running parallel to one another, one of which is guided via the bridging part.

The design and arrangement of the bridging part selectively determines the extent of the clamping force received by the bridging part and therefore passed on to the second spring leaf, unloading to the desired extent the second spring leaf. The nature of the design of the bridging part may include its geometry, shape and the material from which it is made. This and its arrangement between the first spring leaf and the clamping part of the clamp provide force absorption capability and force transmission capacity, also its stiffness and elasticity, can be determined. In this way, the force distribution along the different force-transmission paths described above can be selectively determined. A corresponding embodiment of the bridging part achieves a force-transmission path running via the bridging part to guide wherein substantially exerting the total clamping force of the clamp on the leaf spring, so the second spring leaf is maximally unloaded, in the exemplary example completely unloaded. Other force distributions are likewise achievable.

An unloading of the second spring leaf using the bridging part involves an exceptionally low outlay compared with the production of the total leaf spring assembly and can therefore be achieved simply and cost-effectively. In addition, providing the bridging part allows a simple and compact design of the leaf spring assembly. Its weight, compared with traditional leaf spring assemblies, is not increased substantially or at most slightly by provision of the bridging part.

In accordance and embodiment, the bridging part between the first spring leaf and the clamping part is configured and arranged so it absorbs more than half the clamping force exerted on the leaf springs by the clamp and, the second leaf spring is loaded with less than half this clamping force. The load absorbed by the bridging part can also be called the main load.

A further embodiment includes making the first spring leaf from a metal material and the second spring leaf from a fiber composite material. In this embodiment the unloading of the second leaf spring achieved is advantageous, as the fiber composite spring leaf reacts considerably more sensitively to relatively high clamping forces introduced by the clamp to the spring leaves for a secure fastening of the wheel carrier to the leaf spring, particularly in the region of the clamp to the leaf spring opposite the metal spring leaf, and can under certain circumstances be damaged by these. An overload damaging the fiber composite spring leaf is reliably prevented, the bridging part can be specially configured for the loading capability of the fiber composite spring leaf used in the respective application.

Since the leaf spring has at least two spring leaves, it may also exhibit more than one metal spring leaf and/or more than one fiber composite spring leaf.

The second spring leaf, the fiber composite spring leaf, configured as a supporting spring leaf, also as an additional spring leaf or an auxiliary spring leaf. The supporting spring leaf supports the spring leaf or the other spring leaves, in that it/they is/are additionally supported by the supporting spring leaf with an increasing load or deflection. This support may take effect gradually, for example, as the load on the leaf spring increases. The supporting spring leaf may, for example, be substantially straight in design, so the free ends of the supporting spring leaf are spaced as far apart as possible from the remaining spring leaf or spring leaves when it/they is/are in the unloaded state and only contact it/them when there is a high load. This property provides a progressive characteristic curve of the leaf spring, as the supporting force of the supporting spring leaf increases with the increasing load or deflection of the spring leaf or the other spring leaves. The supporting spring leaf may, however, also be configured substantially to follow the curvature of the spring leaf or the other spring leaves in the unloaded state.

Another embodiment of the invention includes a planar intermediate layer inserted between the first spring leaf and the second spring leaf and/or between the clamping part and the first spring leaf and/or between the second spring leaf and the clamping part. The intermediate layer made of a metal material, a rubber-elastic material and/or a dimensionally stable plastic. The intermediate layer of planar design extending over at least the entire contact surface between the respective adjacent components. An intermediate layer adjacent to a metal spring leaf or a metal clamping part is made of a metal material and forms an intermediate layer made of a rubber-elastic material or a plastic adjacent to a fiber composite spring leaf or a plastic clamping part. The intermediate layer may also include multiple layers, including a metal material on a first side and a rubber-elastic material or a plastic on the opposite second side.

Insertion of an intermediate layer in the intermediate spaces allows in an advantageous, simple manner a thickness adjustment of the assembly made of the two spring leaves enclosed by the clamp, within the clamping part clamping the two spring leaves. In this way, the proportion of the clamping force exerted on the second spring leaf can be selectively changed, as the insertion of an intermediate layer when the clamping part is in an otherwise unchanged position means that closer contact can be established between the second spring leaf and the first spring leaf, because of which the proportion of the clamping force transmitted from the first spring leaf to the second spring leaf is increased. Conversely, by removing an intermediate layer the reverse effect can be achieved. The selection of material for the intermediate layer in each case, its elasticity and stiffness all allow a specific setting in this respect.

The intermediate layer may also be used as tolerance compensation for the assembly made up of at least two spring leaves and the clamp. The intermediate layer, provides for a more uniform load distribution over the entire contact surface of the components lying adjacent to one another across the intermediate layer, which effectively prevents local overloading.

The intermediate layer further prevents penetration of unwanted foreign substances, for example dirt particles, salt, water, and the like, into the respective contact surface occupied by the intermediate layer, preventing or reducing wear of the leaf springs accelerated by these foreign substances, particularly on a spring leaf formed from a fiber composite material.

A further embodiment of the invention, includes the bridging part having a columnar design and extending through a corresponding through-opening in the second spring leaf. The through-opening in the second spring leaf has a diameter sized so the bridging part extends through the second spring leaf in a non-force-fit or form-fit manner wherein the force application direction of the clamping force conducted between the first spring leaf and the clamping part of the clamp. No clamping force absorbed by the bridging part is transmitted to the second spring leaf, corresponding to a force-free passage of the bridging part through the second spring leaf.

The columnar bridging part need not have a constant cross section in its longitudinal extension direction. For example, for the columnar bridging part may have a narrowing or thickening in its columnar profile. Likewise, the columnar bridging part need not have a solid design, it could be hollow or partially hollow in design.

Alignment of a longitudinal axis of the columnar bridging part preferably takes place substantially in a thickness direction of the spring leaves when the leaf spring assembly is in the mounted state on the vehicle, toward a vertical axis of the vehicle. This means the columnar bridging part offers an advantage because the spring leaves cannot be displaced against one another or relative to one another in their longitudinal or lengthwise direction and also in their lateral or crosswise direction, as the columnar bridging part guided through the corresponding through-opening in the second spring leaf and in force-transmitting connection with the first spring leaf and the at least one clamping part of the clamp creates a form fit in relation to the longitudinal and lateral direction of the spring leaves and therefore suppresses the relative movement between them. Wearing, e.g. abrasion, of the spring leaves, particularly on their contact surfaces, caused by a relative movement of this kind is effectively prevented.

The longitudinal or lengthwise direction of the leaf springs or spring leaves is the direction the leaf spring extends from its first end section to the opposite second end section. Correspondingly, the lateral or crosswise direction is a direction running substantially perpendicular to the vibration plane of the leaf spring, wherein the vibration plane through the bending movement of the leaf spring is determined under different load conditions.

The bridging part described above makes it easier to assemble the leaf spring assembly, since the assignment or positioning of the spring leaves in relation to one another and the clamp is already defined by the columnar bridging part. A special assembly device for the alignment of the spring leaves can therefore be dispensed with.

Over the length, extension in its longitudinal direction, of the columnar bridging part, the proportion of the clamping force absorbed and guided by the bridging part from the first spring leaf or clamping part can be defined, as has been described above. In addition, via a corresponding formation of its cross section, influence can also be exerted on the clamping force or load distribution. In this sense, the number of bridging parts, and the distribution thereof over the entire contact surface, can likewise be selectively defined between the spring leaves and/or between the respective spring leaf and the clamping part of the clamp.

Since the columnar bridging part is guided inside the spring leaves, the leaf spring assembly configured in this manner also has a compact design.

Another embodiment includes a plurality of bridging parts, the ends on the spring leaf side facing the first spring leaf and/or the ends on the clamping part side facing the clamping part are attached to the first spring leaf or the clamping part in a force-transmitting manner with insertion of a joint planar pressure plate. The pressure plate may be produced from a metal material or a dimensionally stable plastic, achieving a more uniform clamping force distribution between the first spring leaf or the clamping part and all bridging parts.

One embodiment includes the bridging parts connected to the planar pressure plate in a substance-bonded or form-fitting manner, for example connected thereto by adhesion, welding, screwing, and riveting. A direct, integral embodiment of the planar pressure plate with corresponding bridging parts is likewise possible.

The columnar bridging part may also be configured with a hollow interior, reducing the total weight of the leaf spring assembly. With a hollow, columnar bridging part, a part of the clamp may extend through the hollow or cavity. The clamp may include a clamping part configured in a structurally particularly simple manner, for example, a bolt guided through the hollow or cavity of the bridging part and through corresponding through-openings in the first spring leaf, wherein a screw head configured on one end of the bolt and a threaded nut screwed onto a threaded portion of the bolt formed on the opposite end exert a clamping force on the at least two spring leaves, to press them together.

A further embodiment of the invention includes the clamp having a U-shaped bolt as a first clamping part surrounding the two spring leaves on three sides, wherein in open side of the U-shaped bolt is closed by a clamping plate, secured by threaded nuts as second clamping parts on the free ends of the U-shaped bolt, lying adjacent to one of the two spring leaves as the third clamping part. The clamping plate is preferably a constituent of the wheel carrier to be attached to the leaf spring or the vehicle axle. By corresponding tightening of the threaded nuts, the total clamping force exerted by the fastening clamping means on the at least two spring leaves can be selectively defined.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wheel suspension comprising:
   a leaf spring having a first end section, a second end section opposite the first end section, and a suspension section between the first and second end sections, said suspension section including a first spring leaf and a second spring leaf;
   a clamp in said suspension section exerting a clamping force on said leaf spring and pressing the first spring leaf and second spring leaf together;
   a bridging part between said first spring leaf and said clamp, said bridging part transmits at least a portion of said clamping force between the first spring leaf and the clamp reducing the clamping force on the second spring leaf; and
   said bridging part has a columnar configuration and extends through a correspondingly configured opening in said second spring leaf.

2. The wheel suspension of claim 1 wherein the bridging part reduces the clamping force on the second spring leaf by at least half of the clamping force produced by the clamp.

3. The wheel suspension of claim 1 wherein the first spring leaf is made of a metal material and the second spring leaf is made of a fiber composite material.

4. The wheel suspension of claim 1 including an intermediate layer, said intermediate layer between at least one of said first spring leaf and said second spring leaf, said clamp and said first spring leaf, or said second spring leaf and said clamp; and
   said intermediate layer made of a metal material, a rubber-elastic material or a dimensionally stable plastic.

5. The wheel suspension of claim 1 wherein one end of said bridging part engages a clamping part of said clamp and an opposite end engages said first spring leaf in a force-transmitting manner.

6. The wheel suspension of claim 1 wherein said bridging part is connected to a pressure plate.

7. The wheel suspension of claim 1 wherein said bridging part has a hollow interior.

8. The wheel suspension of claim 7 wherein at least part of said clamp extends through the hollow interior of said bridging part.

9. The wheel suspension of claim 1 wherein said clamp includes a U-bolt having threaded free ends;
   a clamping plate disposed on said threaded free ends and secured by threaded nuts engaging said threaded free ends of said U-bolt; and
   said bridging part engaging said clamping plate.

10. A wheel suspension comprising:
a leaf spring having a suspension section including a first spring leaf and a second spring leaf;
a clamp holding the first spring leaf and second spring leaf adjacent one another, said clamp including a U-bolt having threaded free ends and clamp plate, said clamp plate disposed on said threaded free ends and secured by threaded nuts engaging said threaded free ends of said U-bolt, said first spring leaf and said second spring leaf sandwiched between said U-bolt and said clamp plate;
a bridging part between said first spring leaf and said clamp plate, said bridging part forming a force transmission path that bypasses said second spring leaf and transmits at least a portion of a clamping force from said clamp plate to said first spring leaf reducing the clamping force on the second spring leaf; and
said bridging part has a columnar configuration and extends through an opening in said second spring leaf.

11. The wheel suspension of claim 10 wherein a first end of said bridging part engages said clamp plate and a second end of said bridging part engages first spring leaf.

12. The wheel suspension of claim 10 including an intermediate layer between said first spring leaf and said second spring leaf and between said second spring leaf and said clamp plate.

13. A wheel suspension comprising:
a leaf spring having a suspension section including a first spring leaf and a second spring leaf;
a clamp, holding the first spring leaf and second spring leaf adjacent one another, said clamp including a clamp plate adjacent said second spring leaf; and
a bridging part between said first spring leaf and said clamp plate, said bridging part extending through an opening in said second spring leaf and forming a force transmission path that bypasses said second spring leaf and transmits at least a portion of a clamping force directly from said clamp plate to said first spring leaf reducing the clamping force on the second spring leaf; and
a first end of said bridging part engages said clamp plate and a second end of said bridging part engages said first spring leaf.

\* \* \* \* \*